US007159293B2

(12) United States Patent
Coffield et al.

(10) Patent No.: US 7,159,293 B2
(45) Date of Patent: *Jan. 9, 2007

(54) LOAD BEARING FABRIC ATTACHMENT AND ASSOCIATED METHOD

(75) Inventors: Timothy P. Coffield, Grand Rapids, MI (US); Ronnie K. Watson, Georgetown, TX (US); Soren S. Ingomar Petersen, South Pasadena, CA (US); Matthew E. Chrostowski, Agoura Hills, CA (US); Randall Clark Lewis, Simi Valley, CA (US)

(73) Assignee: Dahti, Inc., Grand Rapids, MI (US)

( * ) Notice: Subject to any disclaimer, the term of this patent is extended or adjusted under 35 U.S.C. 154(b) by 8 days.

This patent is subject to a terminal disclaimer.

(21) Appl. No.: 10/975,724

(22) Filed: Oct. 28, 2004

(65) Prior Publication Data
US 2005/0058813 A1    Mar. 17, 2005

Related U.S. Application Data

(63) Continuation of application No. 09/769,967, filed on Jan. 25, 2001, now Pat. No. 6,842,959.

(51) Int. Cl.
*B23P 11/02*  (2006.01)
*B68G 7/00*   (2006.01)

(52) U.S. Cl. ............... 29/449; 29/448; 29/451; 29/91.5; 160/378

(58) Field of Classification Search .......... 29/449, 29/448, 451, 91.5; 160/378
See application file for complete search history.

(56) References Cited

U.S. PATENT DOCUMENTS

| 101,090 A | 3/1870 | Bingham |
|---|---|---|
| 118,079 A | 8/1871 | Watkins |
| 265,302 A | 10/1882 | Brigham |
| 614,235 A | 11/1898 | Palmer |
| 662,647 A | 11/1900 | Howe |
| 1,120,686 A | 12/1914 | Burrowes |

(Continued)

FOREIGN PATENT DOCUMENTS

CA        653100        11/1962

(Continued)

OTHER PUBLICATIONS

Ultraflex Corporation, "Ultraflex Elastic Webbing for Residential and Commercial Seating", product brochure, 1998.

(Continued)

*Primary Examiner*—Eric Compton
(74) *Attorney, Agent, or Firm*—Warner Norcross & Judd LLP

(57) ABSTRACT

An attachment structure for a load bearing fabric. The attachment structure includes interfitted inner and outer rings. The outer ring includes a fabric leg 74 carrying a load bearing fabric. The inner ring defines a channel receiving the fabric leg 74. The inner ring and outer ring are configured to stretch the fabric upon insertion of the fabric leg 74 into the channel. The present invention also provides a method for securing a load bearing fabric to a support structure, generally including the steps of (a) providing an outer ring having fabric leg 74, (b) attaching a section of load bearing fabric to the fabric leg 74, (c) providing an inner ring having a channel adapted to receive the leg of the outer ring and (d) installing the outer ring to the inner ring by inserting the leg into the channel, the insertion forcing the fabric down into the channel and stretching the fabric to the desired tension.

13 Claims, 10 Drawing Sheets

U.S. PATENT DOCUMENTS

| | | | |
|---|---|---|---|
| 1,864,477 A | 6/1932 | Stannard |
| 1,895,309 A | 1/1933 | Boomershine |
| 2,156,664 A | 5/1939 | Little |
| 2,856,990 A | 10/1958 | Thomas |
| 3,041,109 A | 6/1962 | Eames et al. |
| 3,165,359 A | 1/1965 | Ashkouti |
| 3,175,269 A | 3/1965 | Raduns et al. |
| 3,179,469 A | 4/1965 | Heuston |
| 3,208,085 A | 9/1965 | Grimshaw |
| 3,214,314 A | 10/1965 | Rowbottam |
| 3,298,743 A | 1/1967 | Albinson et al. |
| 3,375,861 A | 4/1968 | Marlow |
| 3,438,099 A | 4/1969 | Green |
| 3,498,668 A | 3/1970 | Vanderminden |
| 3,601,446 A | 8/1971 | Persson |
| 3,640,576 A | 2/1972 | Morrison et al. |
| 3,844,612 A | 10/1974 | Borggren et al. |
| 3,999,802 A | 12/1976 | Powers |
| 4,062,590 A | 12/1977 | Polsky et al. |
| 4,079,529 A | 3/1978 | Jennen et al. |
| 4,304,436 A | 12/1981 | Rowland |
| 4,451,997 A | 6/1984 | Jones |
| 4,456,301 A | 6/1984 | Apissomian |
| 4,458,943 A | 7/1984 | Krakauer |
| 4,472,862 A | 9/1984 | Bloomfield et al. |
| 4,492,408 A | 1/1985 | Lohr |
| 4,558,904 A | 12/1985 | Schultz |
| 4,603,907 A | 8/1986 | Witzki |
| 4,670,072 A | 6/1987 | Pastor et al. |
| 4,697,847 A | 10/1987 | Herschlag |
| 4,743,323 A | 5/1988 | Hettinga |
| 4,796,955 A | 1/1989 | Williams |
| 4,815,499 A | 3/1989 | Johnson |
| 4,826,249 A | 5/1989 | Bradbury |
| 4,842,257 A | 6/1989 | Abu-Isa et al. |
| 4,928,334 A | 5/1990 | Kita |
| 4,939,183 A | 7/1990 | Abu-Isa et al. |
| 4,946,224 A | 8/1990 | Leib |
| 5,009,827 A | 4/1991 | Abu-Isa et al. |
| 5,013,089 A | 5/1991 | Abu-Isa et al. |
| 5,015,034 A | 5/1991 | Kindig et al. |
| 5,127,707 A | 7/1992 | Forcolini |
| 5,176,860 A | 1/1993 | Storch |
| 5,178,815 A | 1/1993 | Yokote et al. |
| 5,288,136 A | 2/1994 | Webber et al. |
| 5,318,348 A | 6/1994 | Hess |
| 5,503,455 A | 4/1996 | Yang |
| 5,662,383 A | 9/1997 | Hand |
| 5,809,624 A | 9/1998 | Nakamae et al. |
| 6,059,368 A | 5/2000 | Stumpf et al. |
| 6,125,521 A | 10/2000 | Stumpf et al. |
| 6,328,548 B1 | 12/2001 | Salas et al. |
| 6,378,944 B1 | 4/2002 | Weisser |
| 6,540,950 B1 | 4/2003 | Coffield |

FOREIGN PATENT DOCUMENTS

| | | | |
|---|---|---|---|
| GB | 918743 | | 2/1963 |
| JP | 02-150321 | * | 6/1990 |
| JP | 2002-240081 | * | 8/2002 |
| RU | 1065262 | | 1/1984 |

OTHER PUBLICATIONS

Rockler Companies, Inc., The Woodworkers' Store 1990, "Metal Ends", p. 41004.

Rockler Companies, Inc., The Woodworkers' Store 1993, "Texweb", p. 40998.

One in Vermillion, "Dymetrol Seating Support Systems, Plastic Extrusion attachment information", http://www.oneinvermillion.com/seating_systems.htm.

One in Vermillion, "Metal Frame Installation Techniques", http://www.oneinvermillion.com/metal_frame.htm.

Photograph of Optiride sample attached as Exhibit A.

* cited by examiner

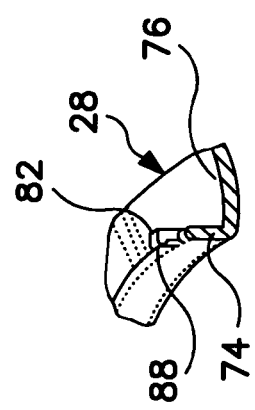
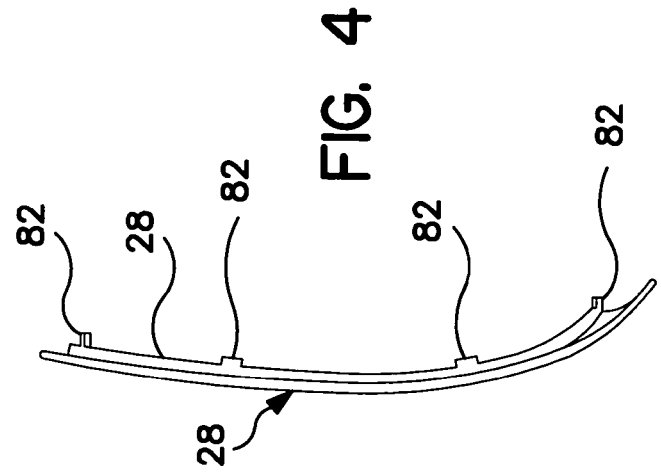
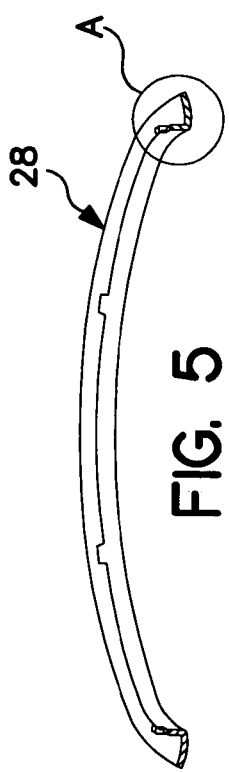
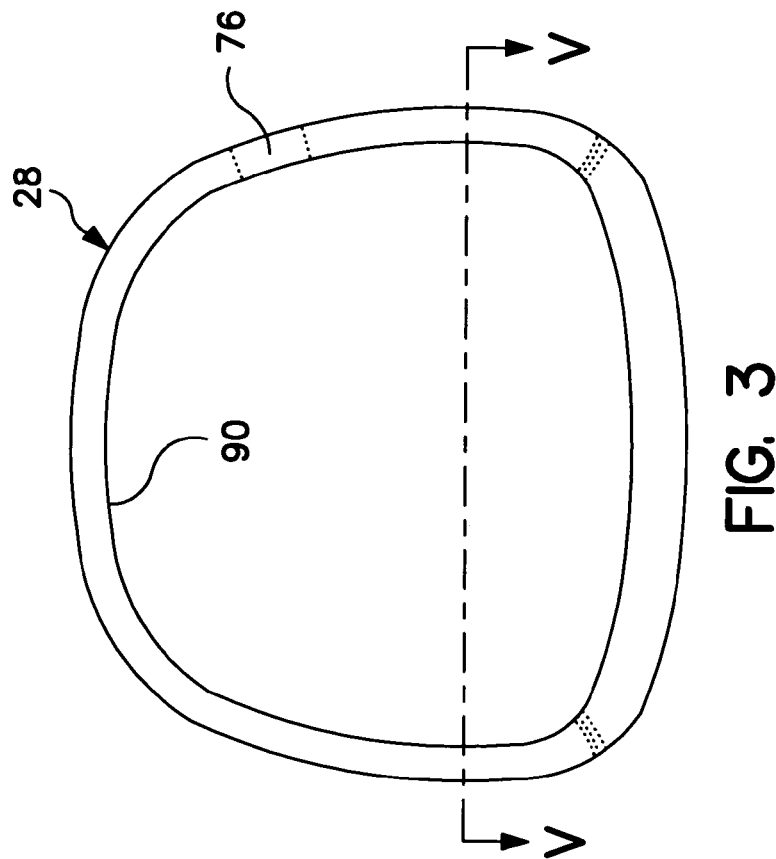

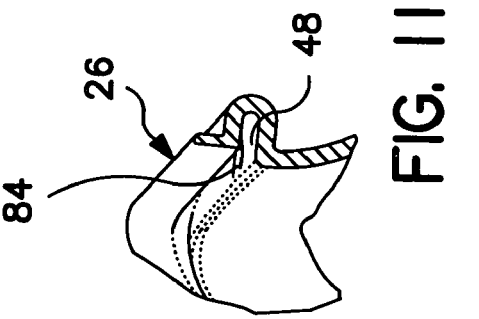
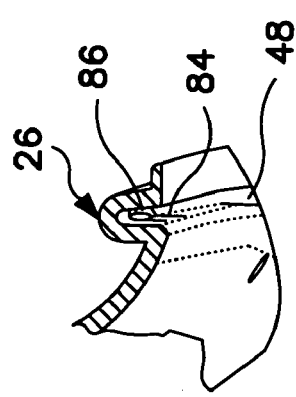
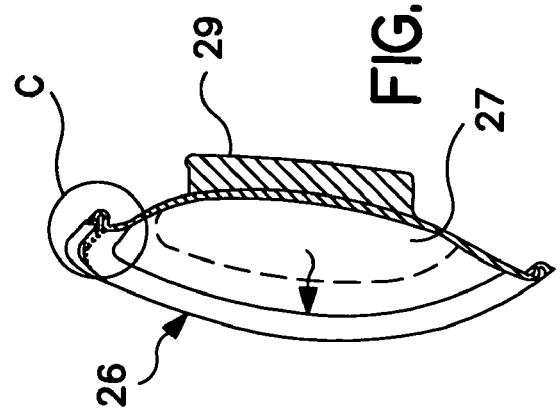
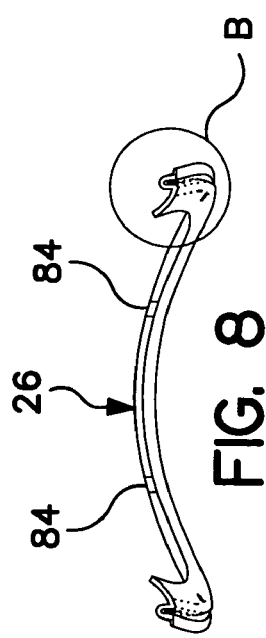
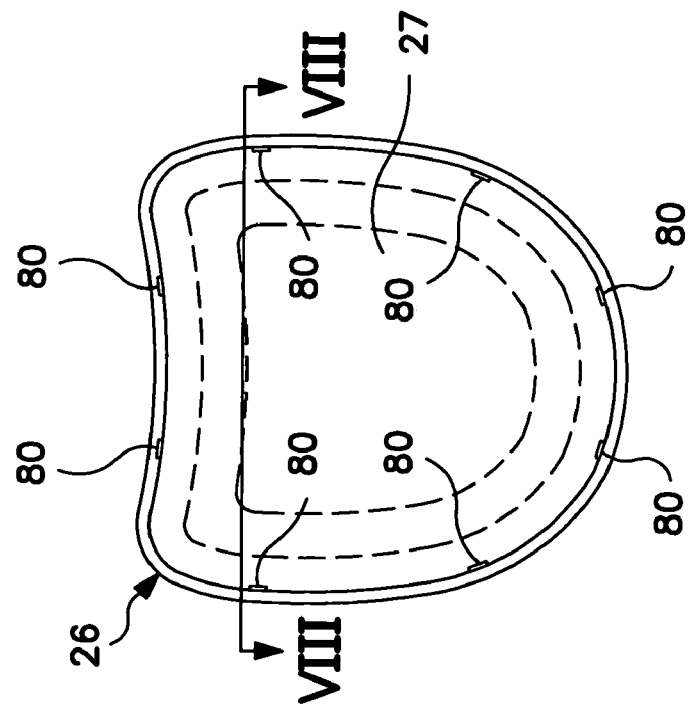

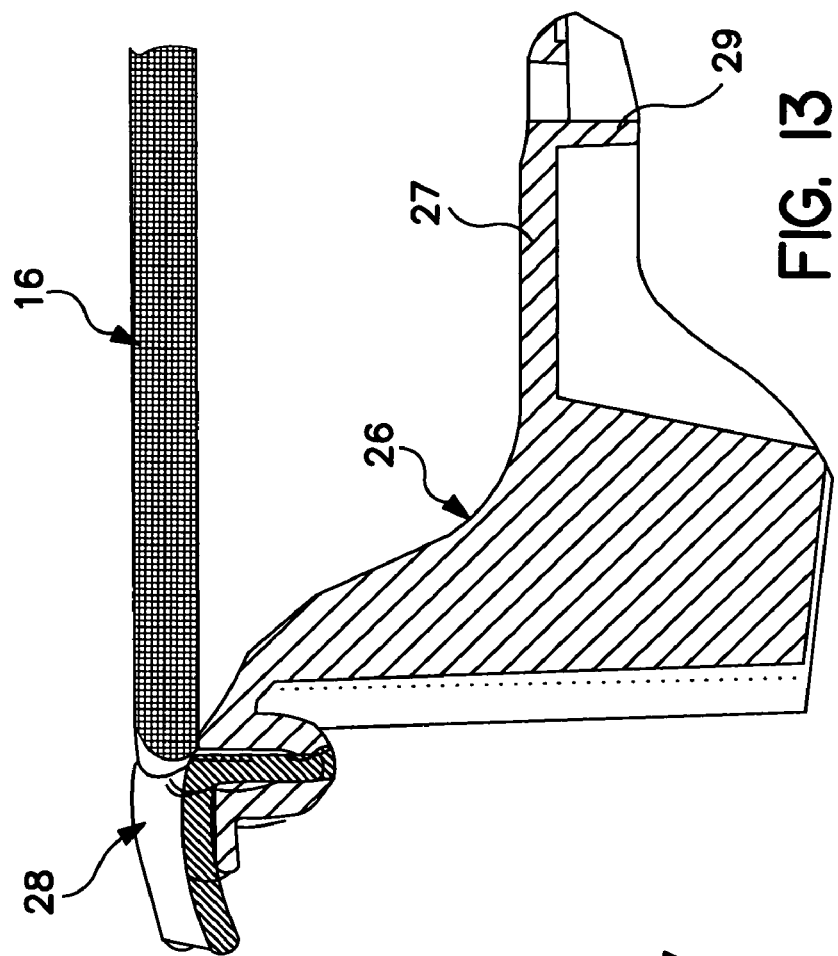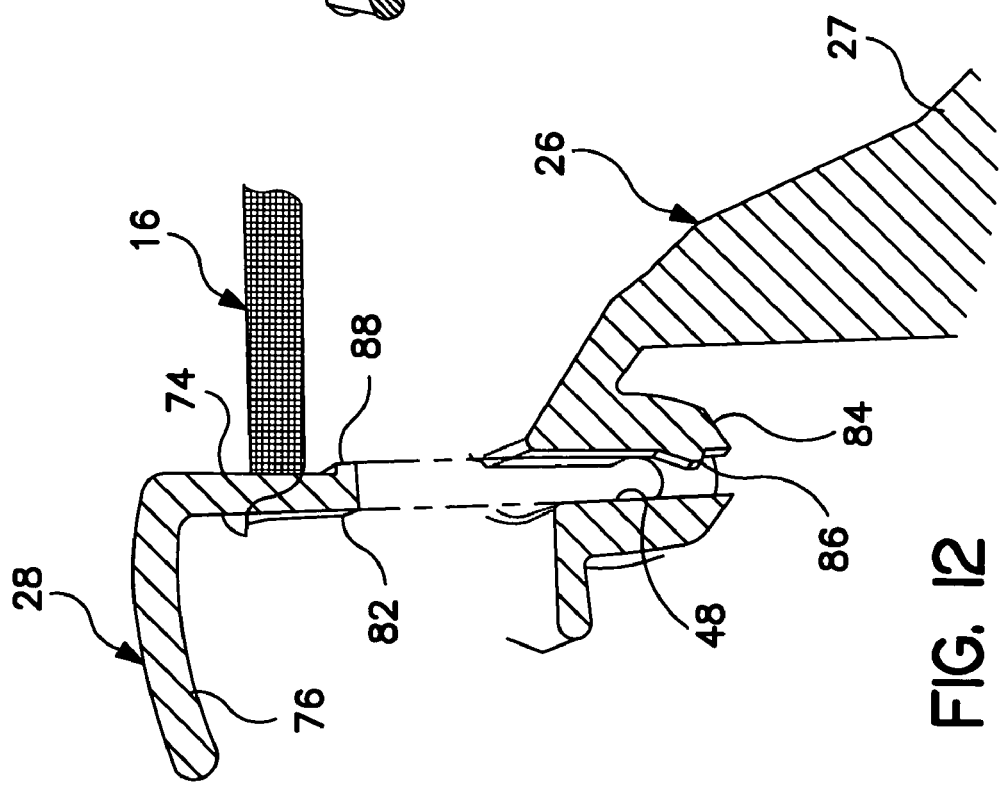

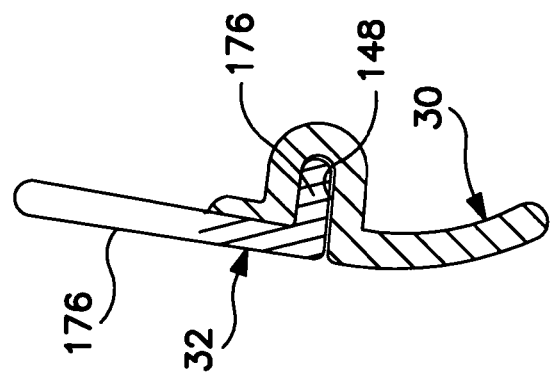
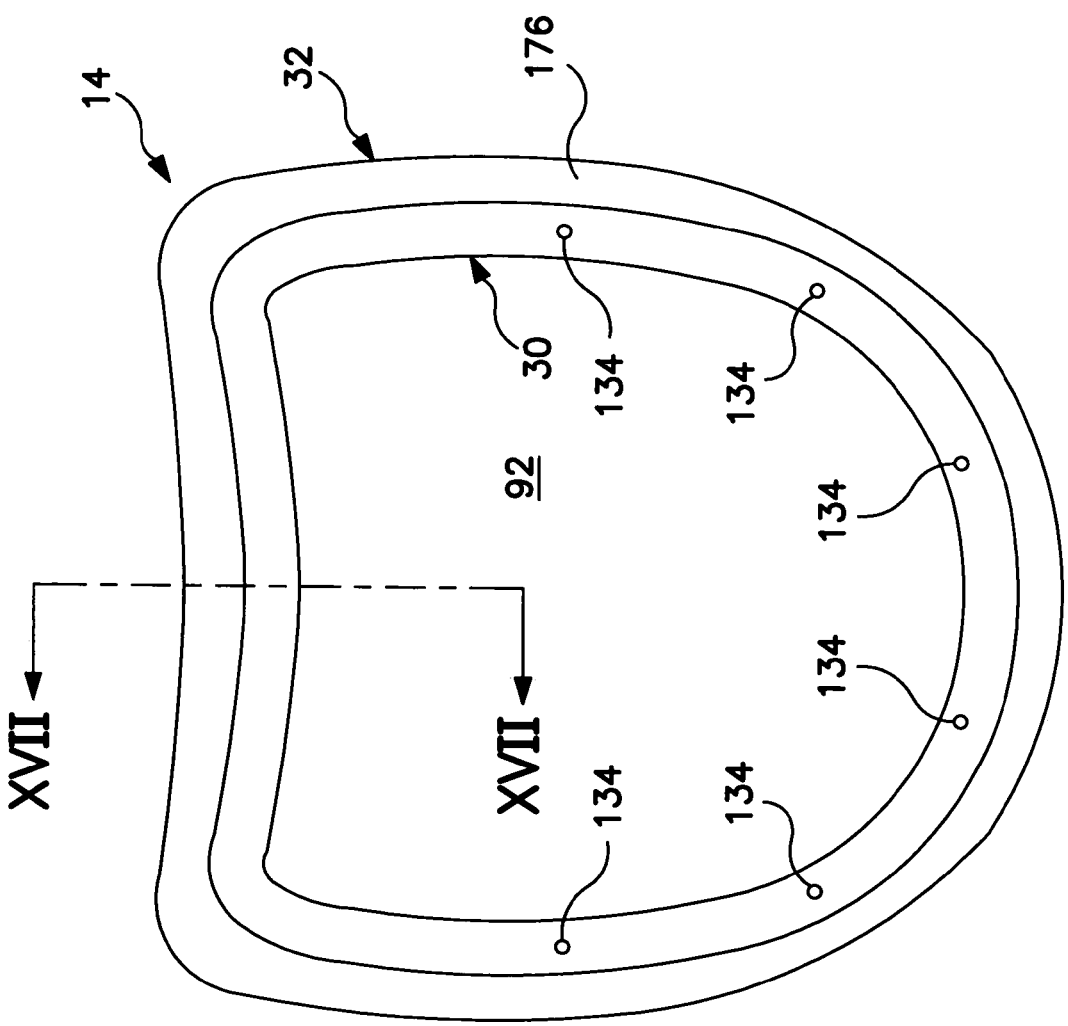

LOAD BEARING FABRIC ATTACHMENT AND ASSOCIATED METHOD

This application is a continuation of U.S. patent application Ser. No. 09/769,967 filed Jan. 25, 2001, to Coffield et al, now U.S. Pat. No. 6,842,959.

BACKGROUND OF THE INVENTION

The present invention relates to load bearing fabric, and more particularly to components and methods for securing a load bearing fabric to a support structure.

The use of load bearing fabrics continues to grow dramatically in various industries, including the automotive, office and home seating industries. The term "load bearing fabric" is commonly used to refer to a class of high strength, highly durable textiles that are typically woven from elastomeric monofilaments and conventional yarns. Some of today's load bearing fabrics have greater strength and durability characteristics than spring steel and other conventional load bearing materials. In addition to their strength and durability characteristics, load bearing fabrics are lightweight and typically have a high modulus of elasticity. Therefore, they are well-suited for use in a variety of applications where a strong and durable yet lightweight or elastic load bearing surface is desired, for example, in seating, cots and wheelchair applications. Further, because load bearing fabrics are aesthetically pleasing they can and often are exposed during use, for example, as the seat or back of an office chair. This eliminates the need to cover or trim conventional load bearing surfaces.

One particularly important challenge related to the use of load bearing fabric is the challenge of attaching the fabric to the support structure. Although load bearing fabrics have high strength and durability characteristics, they must be properly attached to the support structure to provide an end product with the desired strength and durability. This task is particularly challenging because it is typically important to attach the fabric to the support structure in a stretched or tensioned state. This applies a constant load to the connection between the fabric and the support structure.

Conventional attachment methods often fail to provide the necessary strength and durability to withstand the forces applied to the fabric. As a result, the fabric separates from the support structure under conditions that the fabric is otherwise well-suited to survive. In some applications, the bond itself may fail and in other applications, the method of attachment may cause the fabric to unravel or separate along the periphery of the fabric. Accordingly, there is an ongoing effort to develop new and improved methods and components for securing the load bearing fabric to the support structure.

Perhaps the most common use of load bearing fabric is in the furniture industry, where load bearing fabrics are used to form the seat and back of task seating, executive chairs and other office chairs. In the furniture industry, load bearing fabrics are typically secured to a support structure by an outer ring, often in the form of a peripheral frame. The fabric is first attached to the outer ring and then the outer ring is attached to the support structure, such as the seat frame or back frame. In such applications, the challenge is to secure the outer ring in a way that provides a strong and durable bond without damaging or promoting unraveling of the fabric. One conventional method for addressing these issues is to secure the load bearing fabric to an outer ring through encapsulation. In general, encapsulation involves the molding of an outer ring in situ about the peripheral edge of the fabric. During the molding process, the material of the outer ring flows through and becomes intimately intersecured with the fabric. The outer ring is then secured to the support structure using fasteners or other conventional techniques and apparatus.

Although encapsulation provides a strong and durable bond, it suffers from a number of disadvantages. To provide the chair with a firm seat and back, the fabric must typically be tightly stretched over the chair and back frames. The conventional method for providing the fabric with the desired amount of stretch is to hold the fabric in a stretched position while the outer ring is molded in place about the fabric. This operation involves the use of expensive looms and stretching machinery. The stretching machinery stretches the fabric to the desired position. The stretched fabric is then mounted to the loom, which holds the fabric in the stretched position during the molding process. It may also be necessary to provide molding equipment that is specially configured to operate while the loom holds the stretched fabric. Further, when the molded outer ring and fabric emerge from the mold, the force of the stretched fabric can cause the outer ring to deform, for example, to bow or "potato chip." This creates the need to return the outer ring to the desired shape, typically using additional machinery, prior to attachment to the support structure. As can be seen, this conventional encapsulation method requires a relatively complex manufacturing process that employs expensive looms and stretching machinery.

Another alternative is to mold the outer ring from an elastic or stretchable material so that the outer ring can be stretched after it is intersecured with the fabric. In general, this process involves molding the outer ring about the load bearing fabric while the load bearing fabric is in a relaxed state. After the molding process, the outer ring is stretched or expanded to apply the desired tension to the fabric. Although this process provides a marked improvement over the prior art, it requires a separate stretching or expansion step following the molding process.

SUMMARY OF THE INVENTION

The aforementioned problems are overcome by the present invention wherein a load bearing fabric attachment is provided with an outer ring and an inner ring that are configured such that installation of the outer ring to the inner ring stretches the fabric to the desired tension. In the preferred embodiment, the inner ring defines a channel opening in a direction substantially perpendicular to the direction of the fabric. The outer ring includes a leg that is adapted to be fitted within the channel. The fabric is mounted to the leg of the outer ring toward its lower end, such that a portion of the fabric is forced upon assembly to stretch down into the channel in a direction substantially perpendicular to the remainder of the fabric, thereby giving the fabric the desired tension.

In a more preferred embodiment, the outer ring is substantially L-shaped having a first leg that extends substantially in the plane of the fabric and a second leg that extends substantially perpendicularly to the plane of the fabric. The first leg overlies the inner ring and provides the outer ring and inner ring assembly with additional strength and a neat and tidy appearance. The second leg holds the peripheral edge of the fabric and is fitted within the outer ring channel.

In a more preferred embodiment, the location at which the fabric is attached to the second leg of the outer ring is varied about the outer ring to control the amount of stretch in the fabric in different regions. The fabric is preferably attached to the leg through encapsulation to provide a strong and durable attachment of the fabric to the outer ring.

The present invention also provides a method for attaching a load bearing fabric to a support structure. The method generally includes the steps of (a) providing a rigid outer ring for carrying a load bearing fabric, the outer ring having a leg extending substantially perpendicularly to the fabric, (b) attaching an unstretched load bearing fabric to the leg of the outer ring, preferably by encapsulation, (c) providing an inner ring having a channel adapted to receive the leg of the outer ring and (d) installing the outer ring to the inner ring by inserting the leg into the channel, the insertion forcing the fabric down into the channel and stretching the fabric to the desired tension.

The present invention provides a simple and effective method for attaching a load bearing fabric to a support structure. Because the outer ring and inner ring are configured to stretch the fabric upon assembly of the two components, the fabric need not be stretched prior to molding or prior to attachment to the outer ring. Further, the amount of stretch is engineered into the inner and outer rings, and need not be directly controlled during manufactured and assembly. This reduces the cost and complexity of the manufacturing process. The present invention also permits the amount of tension applied to the fabric to vary in different directions, for example, between the left/right direction and the front/rear direction. Accordingly, the present invention provides for an inexpensive yet strong and highly durable attachment.

These and other objects, advantages, and features of the invention will be readily understood and appreciated by reference to the detailed description of the preferred embodiment and the drawings.

BRIEF DESCRIPTION OF THE DRAWINGS

FIG. 3 is a top plan view of the seat outer ring;

FIG. 4 is a side elevational view of the seat outer ring;

FIG. 5 is a sectional view of the seat outer ring taken along line V—V of FIG. 3;

FIG. 6 is an enlarged view of area A of FIG. 5;

FIG. 7 is a top plan view of the seat inner ring;

FIG. 8 is a sectional view of the seat inner ring taken along line VIII—VIII of FIG. 7 with portions removed to show portions of its undersurface;

FIG. 9 is a sectional view of the seat inner ring taken along line IX—IX of FIG. 7;

FIG. 10 is an enlarged view of area B of FIG. 8;

FIG. 11 is an enlarged view of area C of FIG. 9;

FIG. 12 is a sectional view of the seat outer ring and load bearing fabric positioned over the seat inner ring;

FIG. 13 is a sectional view of the seat outer ring and load bearing fabric attached to the seat inner ring;

FIG. 16 is top plan view of the assembled back inner ring and back outer ring;

FIG. 17 is a sectional view of the assembled back inner ring and back outer ring taken along line XVII—XVII of FIG. 16;

DETAILED DESCRIPTION OF THE PREFERRED EMBODIMENT

For purposes of disclosure, and not limitation, the present invention is described in connection with an office chair 10 having load bearing fabric that forms the seat and back of the chair. The present invention is well suited for use in a wide variety of other applications incorporating load bearing fabric. For example, the present invention is well suited for use with footwear soles, mattresses, cots, wheelchairs and a variety of seating applications outside of office furniture.

Figure 1:
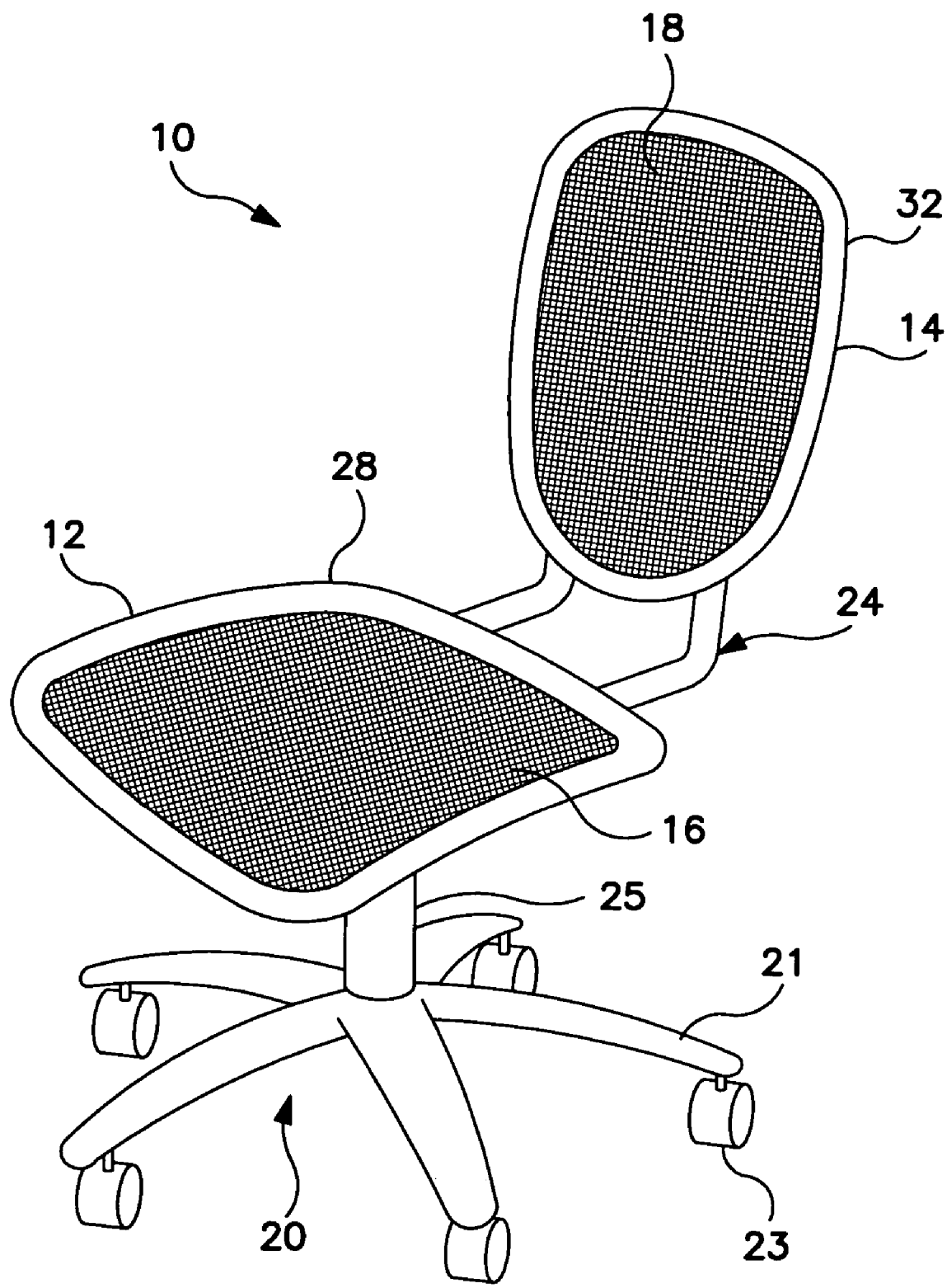
FIG. 1 is a perspective view of an office chair incorporating a preferred embodiment the present invention.
Figure 2:
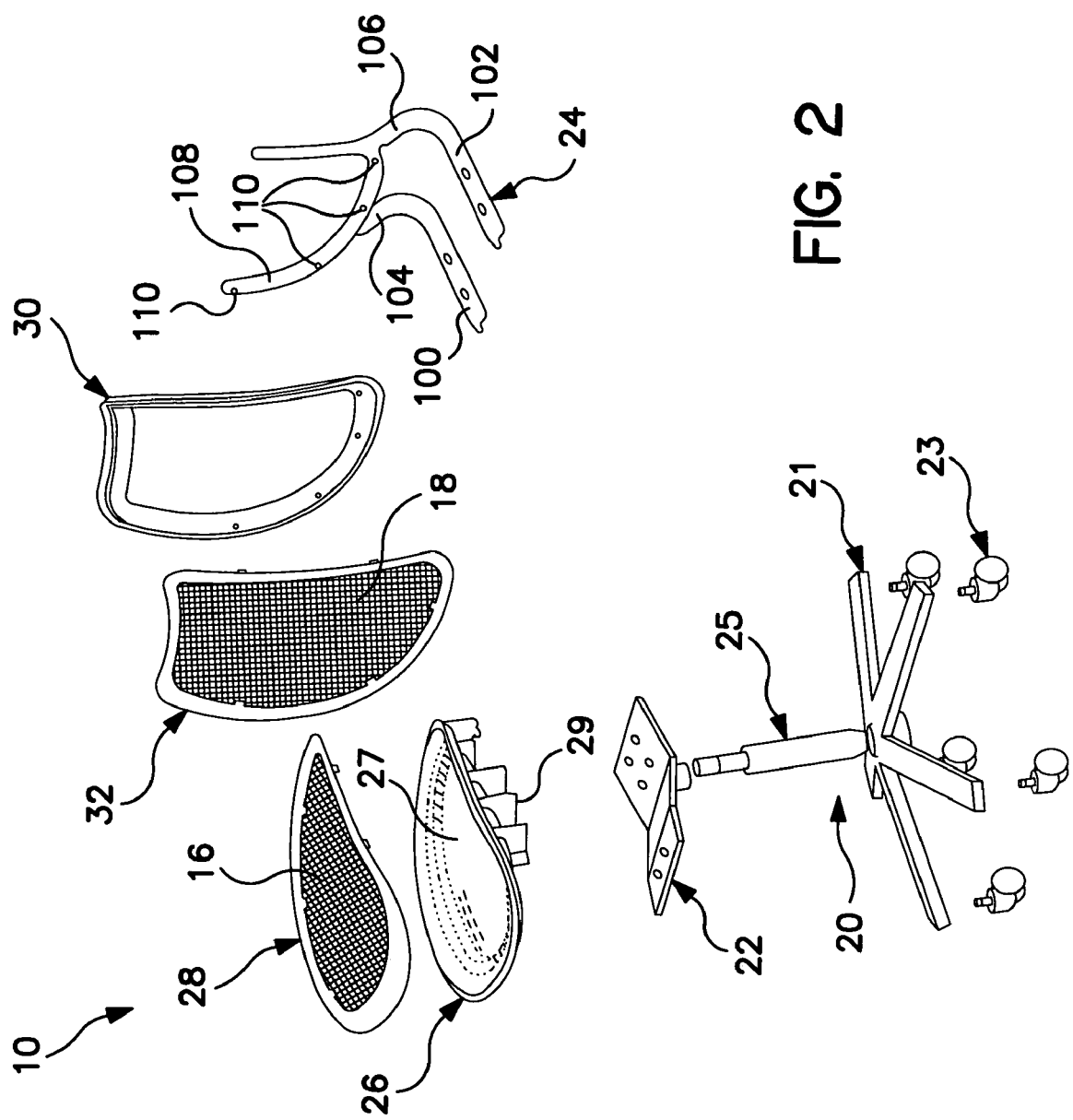
FIG. 2 is an exploded perspective view of the seat.
Figure 14:
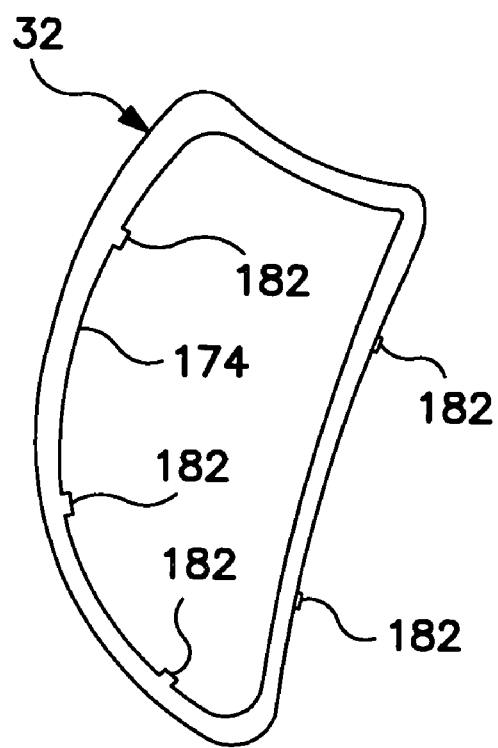
FIG. 14 is a perspective view of the back outer ring.
Figure 15:
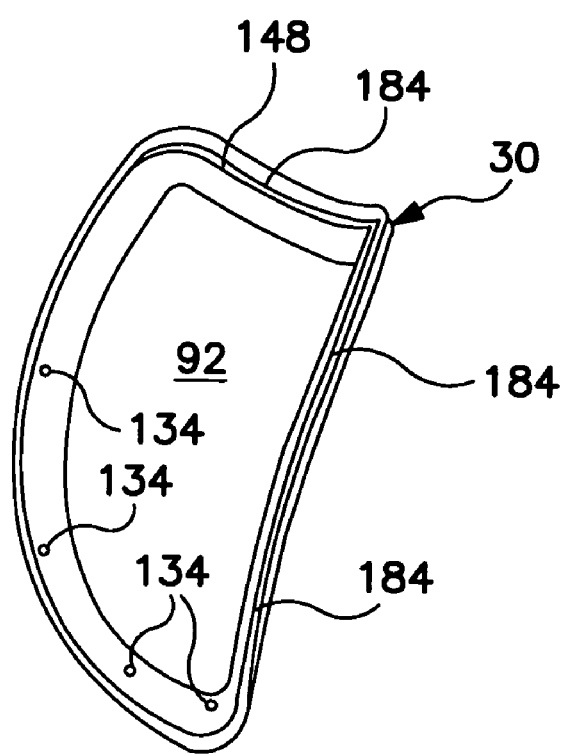
FIG. 15 is a perspective view of the back inner ring.

An office chair manufactured in accordance with a preferred embodiment of the present invention is shown in FIG. 1, and generally designated 10. Referring also to FIG. 2, the office chair 10 includes a conventional base 20 upon which is supported a seat 12 and a back 14. The seat 12 and back 14 each include a load bearing fabric 16 and 18, respectively, that forms the corresponding support surface. The seat 12 includes an inner ring 26 that is preferably an integral portion of the seat frame and an outer ring 28 that carries a section of load bearing fabric 16 and is attached to the inner ring 26. Similarly, the back 14 includes an inner ring 30 that is preferably an integral portion of the back frame and an outer ring 32 that carries a section of load bearing fabric 18 and is attached to the inner ring 26. In general, the seat 12 is manufactured by (a) placing an unstretched section of load bearing fabric 16 in a mold (not shown), (b) molding the outer ring 28 in situ about the periphery of the unstretched fabric 16, (c) fitting the outer ring 28 to the inner ring 26, whereby interaction of the outer ring 28 and inner ring 26 stretches the fabric 16 to the desired tension, and (d) securing the outer ring 28 to the inner ring 26. The back 14 is manufactured in accordance with essentially the same process.

With the exception of the load bearing fabric and the associated attachment components, the office chair 10 is generally conventional. Accordingly, components of the chair 10 not associated with or unique to chair's use of load bearing fabric will not be described in detail. In general, however, the chair 10 includes a conventional base 20 having a five leg pedestal 21 with casters 23, a support column 25 extending upwardly from the pedestal and a top plate 22 mounted atop the support column. The described base 20 is merely exemplary, and it can be replaced by any of a wide variety of conventional bases as desired. For example, the pedestal 21 may be replaced by other conventional pedestals. If desired, the support column 25 can be a conventional height-adjustable column. The seat 12 is mounted to and carried by the top plate 22, for example, by screws, bolts or other conventional fasteners. The chair 10 further includes a generally conventional back support 24, which is mounted to the top plate 22 to provide a mounting surface for the back 14.

The attachment structure and manufacturing method of the present invention will be described in detail with reference to the seat 12 portion of the office chair 10. In the preferred embodiment, the seat 12 generally includes an inner ring 26 that is attached to the top plate 22, an outer ring 28 that is fitted within and attached to the inner ring 26 and a section of load bearing fabric 16 that is affixed to the outer ring 28 (See FIG. 2). Referring now to FIGS. 7–11, the inner ring 26 preferably includes an integral seat pan portion 27. The seat pan portion 27 is generally convex to provide a void beneath the fabric 16, and is shaped to correspond with the desired seat contours. The seat pan portion 27 includes a mounting surface 29 that mounts directly to the top plate 22. For example, the mounting surface 29 preferably includes screw bosses (not shown) adapted to receive screws, bolts or other fasteners (not shown) for securing the seat 12 to the top plate 22 (See FIG. 2). Obviously, the seat 12 can be secured to the top plate 22 in a variety of alternative ways. The inner ring 26 extends around the periphery of the seat pan portion 27 and defines a channel 48 adapted to receive the fabric leg 74 of the outer ring 28, as described in more detail below. The channel 48 preferably extends around the entire inner ring 26, and, as perhaps best shown in FIGS. 11 and 13, is of sufficient dimension to receive substantially all of the fabric leg 74 of the outer ring 28. The inner ring 26 further defines a plurality of locking slots 80 in the floor of the channel 48 that receive the corresponding locking tabs 82 of the outer ring 28 to interconnect the two rings, as described in more detail below. A locking finger 84 is disposed adjacent to each slot 80 to lock the outer ring 28 in place within the inner ring 26. The locking fingers 84 each include a barb 86 adapted to interlock with a corresponding barb 88 on the locking tabs 82. The locking fingers 84 are formed in the wall of the inner ring 26 and are somewhat flexible permitting deflection of the fingers 84 during installation of the outer ring 28. If desired, the bottom wall of the channel 48 may also or alternatively define screw clearance holes, screw bosses or other conventional elements to further or alternatively secure attachment of the outer ring 28 within the channel 48. In the preferred embodiment, the inner ring 26 is an integral portion of the seat frame being integrally attached to the seat pan portion 27. Alternatively, the seat inner ring 26 can be manufactured as an annular component that is separate from the seat pan (not shown). If so, the inner ring 26 can be attached to the seat pan or other structural component that is supported upon the top plate 22 or directly upon the pedestal.

As noted above, the outer ring 28 carries the fabric 16 and interacts with the inner ring 26 to stretch the fabric 16 to the desired tension upon installation of the outer ring 28 to the inner ring 26. Referring now to FIGS. 3–6, the outer ring 28 is a rigid, generally peripheral frame defining a central opening 90 over which the fabric 16 is suspended. The outer ring 28 is shaped and contoured to correspond with the shape and contours of the inner ring 26. The outer ring 28 is substantially L-shaped in cross section defining a trim leg 76 and a fabric leg 74. The trim leg 76 extends in an outwardly direction in substantial alignment with the fabric 16. The trim leg 76 strengthens the outer ring 28 and provides the seat 12 with a neat and tidy appearance. The size and shape of the trim leg 76 may vary from application to application, and may be eliminated in some applications, if desired. The fabric leg 74 is a substantially straight leg adapted to be fitted into the channel 48 of the inner ring 26. The fabric leg 74 also carries the peripheral edge of the fabric 16. In the preferred embodiment, the fabric 16 is encapsulated within the fabric leg 74, meaning that the fabric leg 74 is molded about the fabric 16 such that the peripheral edge of the fabric 16 is intimately intersecured with the fabric leg 74 during the molding process. Alternatively, the fabric 16 can be attached to the fabric leg 74 by mechanical attachments, such as mounting screws extending through a mounting strip (not shown). As described in more detail below, the insertion of the fabric leg 74 into the channel 48 causes the fabric 16 to stretch to the desired tension (See FIGS. 12 and 13). By varying the position at which the fabric 16 is attached to the fabric leg 74 the amount of stretch applied to the fabric 16 can be controlled. For example, mounting the fabric 16 adjacent to the lower end of the fabric leg 74 will result in a greater amount of stretch while mounting the fabric 16 adjacent to the upper end of the fabric leg 74 will result in a lesser amount of stretch. In the preferred embodiment, the fabric 16 is attached to the fabric leg 74 in such a way as to provide substantially more stretch in the left/right direction than in the front/rear direction. More specifically, the preferred embodiment is designed to provide approximately 4.5% stretch in the left/right direction and less than approximately 1% stretch in the front/rear direction. To provide the desired variation in tension, the fabric 16 is attached lower on the fabric leg 74 along the left and right sides of the outer ring 28 and higher on the fabric leg 74 along the front and rear sides of the outer ring 28. The outer ring 28 preferably includes an approximately three inch transition portion in each corner in which the fabric 16 transitions between its different mounting locations on along the various sides. In the preferred embodiment, the load bearing fabric 16 includes elastic monofilaments extending in the left/right direction and substantially nonelastic yarns extending in the front/rear direction. As a result, the greater amount of stretch is applied to the fabric 16 in the direction of the elastic monofilaments.

The outer ring 28 further includes a plurality of locking tabs 82 extending downwardly from the lower edge of the fabric leg 74. The locking tabs 82 each include a barb 88 and are shaped and positioned to be snap-fitted into the locking slots 80 of the inner ring 26. The locking tab barbs 88 interlock with the corresponding locking finger barbs 86 to intersecure the inner ring 26 and outer ring 28. At least one of the barbs 86 or 88 preferably includes a ramped surface that cause the locking tabs 82 and/or locking fingers 84 to flex away from each other during insertion of the fabric leg 74 into the channel 48.

The load bearing fabric 16 conforms to the desired shape of the seat 12. More specifically, the size and shape of the load bearing fabric 16 is preselected to accommodate the precise size and shape of the outer ring 28. As described in more detail below, the load bearing fabric may be any of wide variety of load bearing fabrics, including polyester elastomer fabrics. For purposes of this application, the term "fabric" refers to both woven and non-woven materials, including without limitations knit materials. If desired, woven fabrics with welded warp and weft intersections can be used. These fabrics are particularly well-suited for use in applications in which the material of the outer ring is not from the same family of resin as the materials as the fabric. In such applications, the welded intersections permit the outer ring 28 to more securely interlocks with the fabric 16. In general, the seat outer ring 28 is molded in place about the fabric 16 so that the material of the seat outer ring 28 flows through and entraps the warps and wefts to provide a secure interconnection between the outer ring 28 and fabric 16. Where the resin of the outer ring 28 is from the same family as the resin of the fabric 16, the outer ring 28 and the fabric 16 adhere to one another. The encapsulation process not only produces a strong bond, but also reduces the likelihood of the fabric unraveling along its periphery. Although the seat outer ring 28 is preferably attached to the fabric 16 using encapsulation, the seat outer ring can be separately manufactured and attached to the fabric using conventional attachment techniques. For example, the outer ring can be manufactured from two parts that sandwiched the fabric (not shown).

The back 14 of the chair 10 is constructed in accordance with substantially the same principles as the seat 12 (See FIGS. 14–17). Although the size and shape of the back 14 differ from those of the seat 12, the general components and method of manufacture of the back 14 are substantially identical to those of the seat 12. Accordingly, the construction and method of manufacture of the back 14 will not be described in detail. Suffice it to say that the back 14 includes a back inner ring 30, a back outer ring 32 and a section of load bearing fabric 18. The back inner ring 30 defines a channel 148 and is mounted to the back support 24. Unlike the seat inner ring 26, the back inner ring 30 has open center 92, and preferably does not include a seat pan or the equivalent thereof. The back outer ring 32 includes a trim leg 176 and a fabric leg 174, and is molded in situ about the fabric 18 while the fabric 18 is in a relaxed state. In the preferred embodiment, the location at which the fabric 18 is attached to the fabric leg 174 varies along the back outer ring 32 and is selected to provide less than approximately 1% stretch in the left/right direction and approximately 6–7% stretch in the top/bottom direction. To provide the desired variation in tension, the fabric 18 is attached higher on the fabric leg 174 along the left and right sides of the back outer ring 32 and lower on the fabric leg 174 along the front and rear sides of the back outer ring 32. As with seat outer ring 28, the back outer ring 32 preferably includes an approximately three inch transition portion in each corner in which the fabric 18 transitions between its different mounting locations on along the various sides. As noted above, the load bearing fabric 18 preferably includes elastic monofilaments intersecting with substantially nonelastic yarns. In the back 14, the elastic monofilaments extend in the left/right direction and the yarns extend in the up/down direction. As a result, the greater amount of stretch is applied to the fabric 18 in the direction of the substantially nonelastic yarns.

As noted above, the back 14 is mounted to the chair 10 upon back support 24. The back support 24 is generally L-shaped having a pair of lower legs 100 and 102 that extend substantially horizontally and mount to the top plate 22, for example, by bolts (not shown). The back support 24 further includes a pair of upright legs 104 and 106 that extend upwardly from the lower legs 100 and 102, respectively. A generally U-shaped mounting bracket 108 is disposed at the upper ends of the upright legs 104 and 106. The back support 24 is preferably fabricated from metal with the mounting bracket 108 being welded to the upright legs 104 and 106. Alternatively, the back support 24 can be molded or cast as a one-piece unit from a high strength material, such as metals or high strength plastics. In any event, the mounting bracket 108 is shaped to correspond with the inner ring 30 of the back 12, and preferably defines a plurality of spaced mounting holes 110 that permit the inner ring 30 to be screwed or bolted to the back support 24 in a conventional manner.

MANUFACTURE AND ASSEMBLY

The base 20, top plate 22 and back support 24 are manufactured using conventional techniques and apparatus. In the described embodiment, the base 20 is assembled from a conventional five-leg pedestal 21, casters 23 and a conventional support column 25. The pedestal 21, caster 23 and support column 25 are preferably premanufactured, and are available from a variety of well-known suppliers. The top plate 22 is configured in a conventional manner to mount to the support column 25 and to supportably receive the seat inner ring 26. Similarly, the back support 24 is configured as described above to be attached to the top plate 22 and to supportably receive the back inner ring 30. The top plate 22 and back support 24 are preferably fabricated from an appropriate metal, such as an aluminum alloy, but may alternatively be manufactured from other metals or structural plastics. If desired, a height control, recliner, seat tilt control and other adjustment mechanisms can be incorporated into chair 10, for example, into the pedestal 20, the top plate or the back support 24.

The load bearing fabric 16 and 18 is premanufactured and is available from a variety of well-known suppliers. For example, the fabric may be manufactured from Dymetrol fabric available from Acme Mills of Detroit, Mich.; Pellicle fabric available from Quantum Inc. of Colfax, N.C.; Collage fabric available from Matrix of Greensboro, N.C. or Flexnet fabric available from Milliken of Spartanburg, S.C. The load bearing fabric 16 preferably a welded fabric. The load bearing fabric 16 and 18 is cut, preferably using conventional die cutting techniques and apparatus. The size and shape of the fabric 16 and 18 is preselected, such that it assumes the desired tension upon insertion of the outer ring into the inner ring. The fabric 16 and 18 preferably includes a peripheral marginal portion 17 that can be held between the base die 64 and the cover die 66 to hold the fabric in the desired position within the mold.

Figure 18:
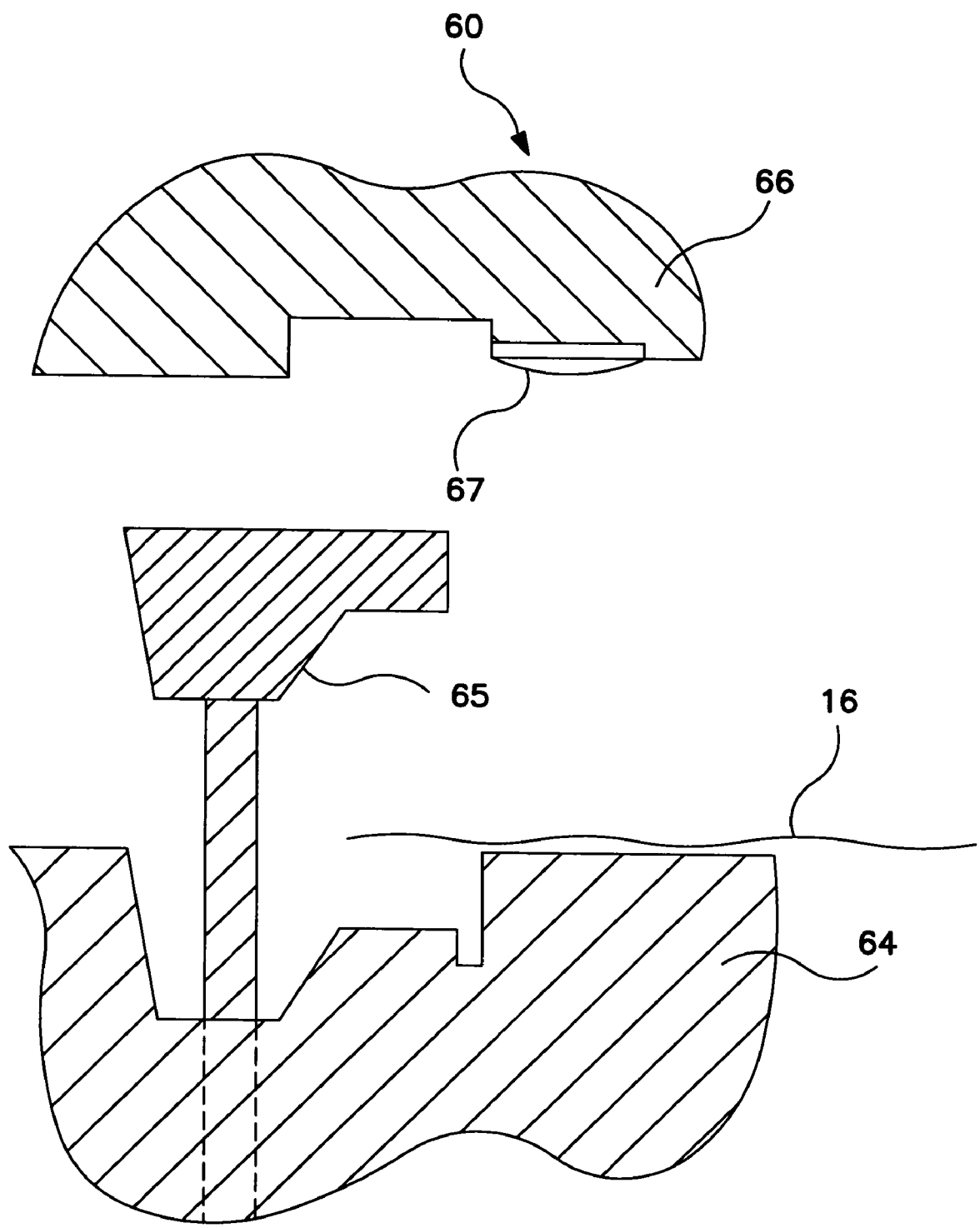
FIG. 18 is a sectional view of an open mold in a first location along the ring.
Figure 19:
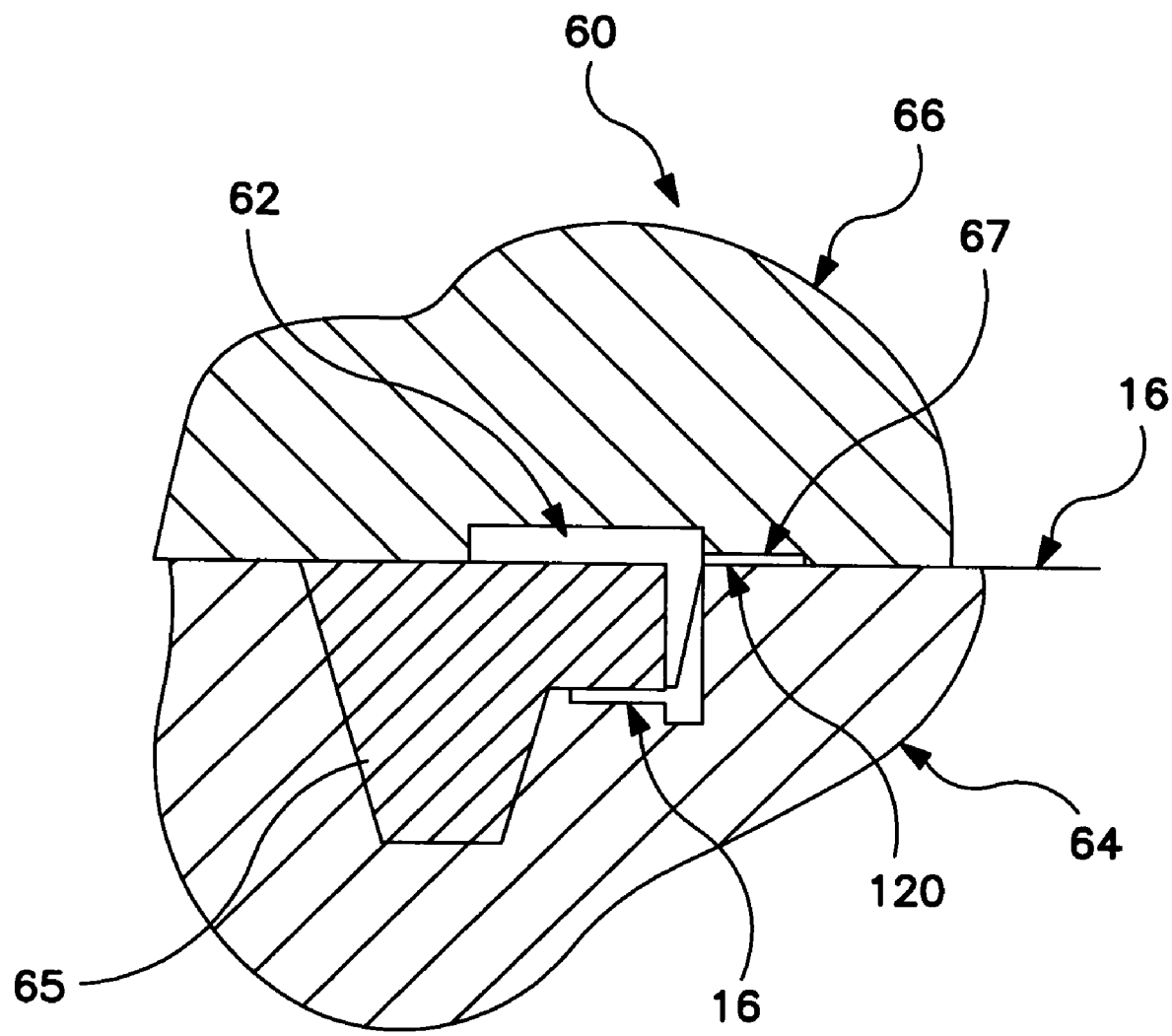
FIG. 19 is a sectional view of a closed mold in a first location along the ring.
Figure 20:
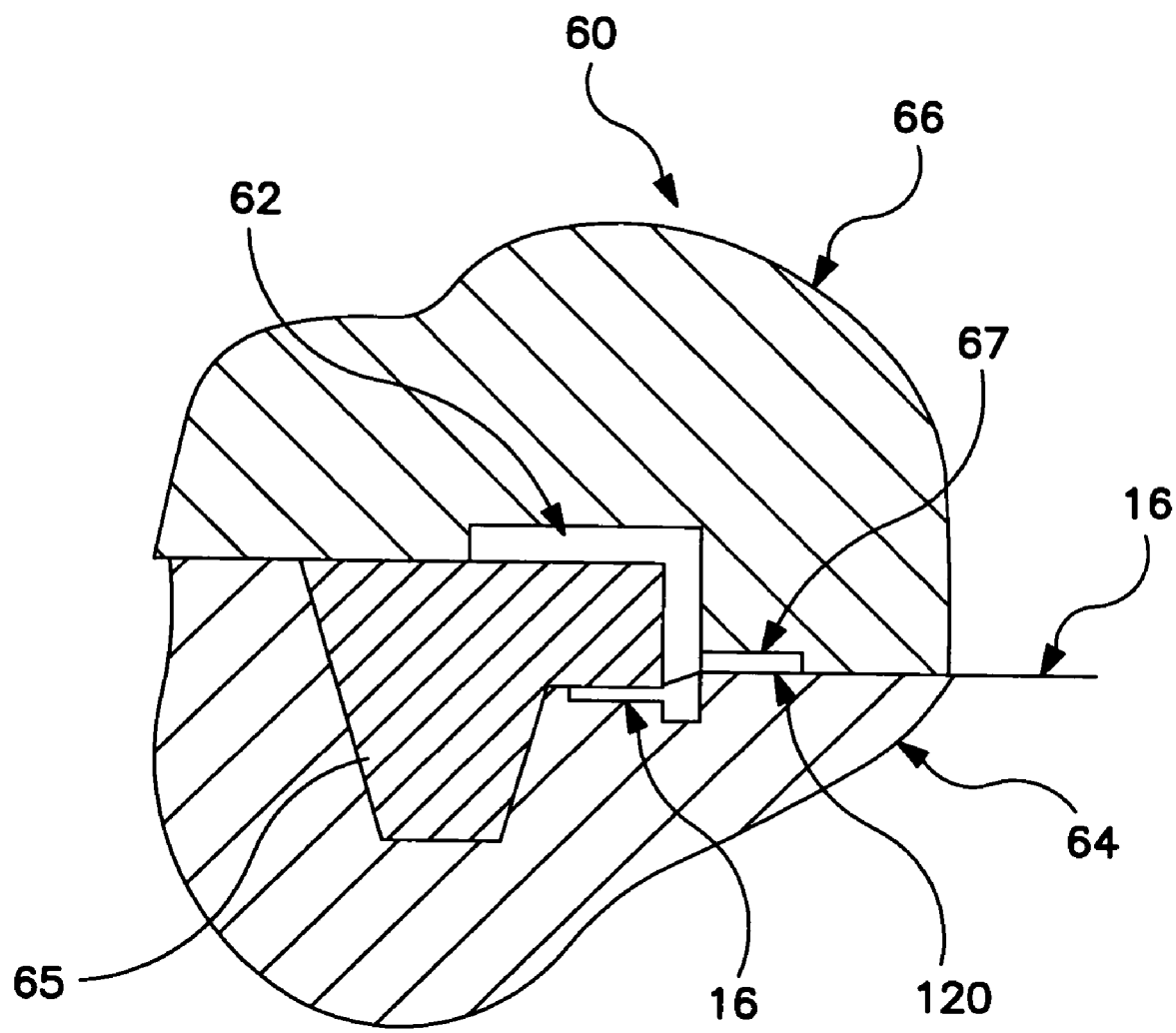
FIG. 20 is a sectional view of the mold in a second location along the ring.

The molding process will now be described in connection with the manufacture of the seat outer ring 28. Referring now to FIGS. 18–20, the mold 60 includes an base die 64 and a cover die 66 that are shaped to define a mold cavity 62 in the desired shape of the seat outer ring 28. The dies 64 and 66 are shaped to define a parting line 120 adjacent to portion of the mold cavity 62 that forms the fabric leg 74 such that the fabric 16 enters the mold cavity at the fabric leg 74. As noted above, the preferred embodiment provides the fabric 16 with significant stretch in the left/right direction and only minor stretch in the front/rear direction. The location of the parting line 120 will vary along the seat outer ring 28 to encapsulate the fabric 16 within the fabric leg 74 at different locations at various locations in the seat outer ring 28. As noted above, this provides the fabric 16 with differing amounts of stretch in different directions. The base die 64 includes a conventional lifter 65 that grips the peripheral edge of the fabric 16 to hold it in place during the molding process. FIG. 19 is a sectional view of a first portion of the mold 60 showing the fabric 16 entering the mold cavity 62 near the top of the fabric leg 74. FIG. 19 is representative of the configuration of the mold 60 along the front and rear segments of the seat outer ring 28. As a result, the fabric 19 will be provided with relatively little stretch in the front/rear direction. FIG. 20 is a sectional view of a second portion of the mold 60 showing the fabric 16 entering the mold cavity 62 toward the bottom of the fabric leg 74. FIG. 20 is representative of the configuration of the mold 60 along the left and right segments of the seat outer ring 28. As a result, the fabric 16 will be provided with significantly more stretch in the left/right direction than in the front/rear direction. The dies 64 and 66 are configured to provide an approximately three inch transition portion in the corners of the mold cavity 62 where the parting line 120, or the entry point of the fabric 16, transitions between the locations shown in FIGS. 19 and 20. The location of the parting line 120 at various regions of the seat outer ring 28 will vary from application to application to accommodate the desired stretch profile for that application. If desired, the cover die 66 can include a conventional steel gasket 67 to aid in preventing the flow of molten material from the mold cavity 62. The gasket 67 can be coated with silicone, urethane or other conventional materials.

The load bearing fabric 16 is placed in the mold cavity 62 of the mold 60 for the seat outer ring 28. The fabric 16 is placed in the mold cavity 62 in a relaxed state with no creases or folds. The fabric 16 preferably extends through the mold cavity 62 and is trapped along a peripheral marginal portion by lifter 65 (See FIGS. 19 and 20). Alternatively, the fabric 16 may be trapped directly between the base die 64 and cover die 66 (not shown) or it may terminate within the cavity (not shown). In the preferred embodiment, the dies 64 and 66 define a slight relief 68 inwardly from the mold cavity to prevent potential crushing damage to the fabric 16 inwardly from the outer ring 28 when the dies are closed. The relief 68 is, however, small enough to prevent the flow of molten material out of the mold cavity 62 and into the relief 68. Gasket 67 further aids in preventing the flow of molten material out of the mold cavity 62 through the parting line 120. The seat outer ring 28 is injection molded about the periphery of the fabric 16 using generally conventional molding techniques and apparatus. Suffice it to say that molten material is introduced into the mold cavity 62, where it flows through and, after curing, becomes intimately interconnected with the fabric 16. The seat outer ring 28 is preferably manufactured from a thermoplastic, such as polypropylene, nylon, polyester, or a thermoset, such as a structural epoxy resin. After the seat outer ring 28 is sufficiently cured, the outer ring/fabric assembly is removed from the mold, providing a relaxed fabric 16 contained within a rigid outer ring 28. Any peripheral marginal portion 17 can be trimmed from the fabric 16 as desired. In applications where a welded fabric is not used, the outer ring is preferably manufactured from a resin selected from the same family of resins as the fabric 16, such as Hytrel 4556 or 5556 available from Dupont, Arnitel EM 440 available from Dutch State Mine ("DSM") of Evansville, Ind. This promotes a strong and durable bond between the fabric 16 and the outer ring 28.

The seat inner ring 26 is also manufactured using conventional molding apparatus. The seat inner ring 26 is molded with channel 48 to receive the seat outer ring 28. The channel 48 is not, however, strictly necessary and the seat outer ring 28 can be attached to a substantially vertical outer surface of the seat inner ring 26 using conventional fasteners or the like. The seat inner ring 26 is molded with seat pan portion 27 and mounting portion 29. The seat inner ring 26 is preferably manufactured from nylon, polypropylene or PET or other structural resins, and may be reinforced with glass fibers or other similar reinforcement materials. After it is sufficiently cured, the seat inner ring 26 is removed from the mold. A plurality of screw holes (not shown) are drilled into the mounting structure 29 of seat pan portion 27 to receive screw (not shown) for intersecuring the seat inner ring 26 to the top plate 22. The number and location of screw holes will vary from application.

The seat outer ring 28 is next mounted to the seat inner ring 26. In general, the seat outer ring 28 is attached to the seat inner ring 26 by inserting the fabric leg 74 into the channel 48. The seat inner ring 26 is inserted into the channel 48 until the locking tabs 82 and locking fingers 84 interlock to hold the inner ring 26 and outer ring 28 together. Alternatively, the locking tabs 82 and locking fingers 84 can be removed and the inner ring 26 and outer ring 28 can be intersecured by screws, adhesive or other conventional methods. The outer ring 28 is preferably inserted into the inner ring 26 using a conventional press (not shown), but can be inserted manually in some applications, depending primarily on the required amount of force. The seat inner ring 26 is then secured to the top plate 22, for example, by screws, to complete assembly of the seat 12.

As noted above, the back 14 is manufactured and constructed in a manner similar to the seat 12. In short, the seat back fabric 18 is cut to the desired shape, the back outer ring 32 is molded in situ onto the fabric 18, the back inner ring 30 is molded, and the back outer ring 32 and fabric 18 are inserted into the back inner ring 30 until the locking fingers 184 and locking tabs 182 interlock. The back inner ring 30 and outer ring 32 are preferably manufactured using molds (not shown) that are substantially similar to the molds used in manufacturing the seat inner ring 26 and outer ring 28. A plurality of screw holes 134 are formed in the inner ring 30, preferably either integrally molded with the inner ring 30 are drilled into the inner ring 30 after the inner ring 30 is molded. The assembled back 14 is then mounted to the back support 24 in a generally conventional manner, for example, using screws extending through screw holes 134 in the inner ring 30 and the mounting holes 110 in the back support 24.

The above description is that of a preferred embodiment of the invention. Various alterations and changes can be made without departing from the spirit and broader aspects of the invention as defined in the appended claims, which are to be interpreted in accordance with the principles of patent law including the doctrine of equivalents. Any reference to claim elements in the singular, for example, using the articles □a,□ □an,□ □the□ or □said,□ is not to be construed as limiting the element to the singular.

The invention claimed is:

1. A method for attaching a load bearing fabric to a support structure, comprising the steps of:
   producing a first ring;
   attaching a segment of load bearing fabric to an attachment portion of the first ring;
   producing a second ring including a receptacle portion adapted to receive the attachment portion of the first ring;
   interfitting the second ring and the first ring, at least one of the second ring and the first ring including a stretching means for stretching the fabric as a result of said interfitting by inserting the attachment portion of the first ring into the receptacle portion of the second ring; and
   securing the second ring and the first ring in interfitted relation to maintain the fabric in a stretched configuration.

2. The method of claim 1 wherein said attaching step includes the steps of:
   placing the fabric in a mold in a relaxed state; and
   molding the attachment portion of the first ring in situ about the fabric, whereby the first ring and the fabric become an integral combination.

3. The method of claim 1 wherein at least one of the second ring and first ring includes integral locking tabs, said securing step including inserting the first ring into the second ring until the locking tabs interlock the second ring and the first ring.

4. A method for attaching a load bearing fabric to a support structure, comprising the steps of:
   producing a first ring, the first ring including an attachment portion extending outwardly from the first ring;
   molding the attachment portion of the first ring to a segment of load bearing fabric;
   producing a second ring adapted to interfit with attachment portion of the first ring;

interfitting the first ring and the second ring, at least one of the first ring and the second ring including a stretching means for stretching the fabric as a result of said interfitting; and;

securing the first ring and the second ring in interfitted relation to maintain the fabric in a stretched configuration.

5. The method of claim 4 wherein said molding step includes the steps of:

placing the fabric in a mold in a relaxed state; and molding the first ring in situ about the fabric, whereby the first ring and the fabric become an integral combination.

6. The method of claim 5 at least one of the first ring and second ring includes integral locking tabs, said securing step including inserting the first ring into the second ring until the locking tabs interlock the second ring and the first ring.

7. A method for securing a load bearing fabric to a support structure, comprising the steps of:

providing a first ring defining a central opening and carrying a load bearing fabric extending inwardly over the opening of the first ring, the fabric generally defining a plane, the first ring including an attachment portion extending outwardly from the plane, a segment of the fabric attached to the attachment portion;

providing a second ring adapted to interfit with the first ring;

interfitting the first ring and the second ring by relative movement of the first ring and the second ring, relative movement of the first ring and the second ring causing a portion of the fabric to extend at an angle to the remainder of the fabric, whereby the fabric is stretched to a desired tension upon said interfitting step; and securing the first ring and the second ring together after said interfitting step to maintain the fabric at the desired tension.

8. The method of claim 7 wherein the second ring includes a portion extending in the direction substantially perpendicular to the fabric and being configured to fit within the opening defined by the first ring, said interfitting step including the step of inserting the portion of the second ring into the opening defined by the first ring, whereby the portion of the second ring engages the fabric and forces a portion of the fabric to extend in a direction substantially perpendicular to the remainder of the fabric.

9. The method of claim 8 wherein the attachment portion of the first ring is a fabric leg, and wherein the second ring defines a channel adapted to receive the fabric leg of the first ring, said interfitting step including the step of inserting the fabric leg into the channel.

10. The method of claim 9 wherein a location at which the fabric is attached to the fabric leg varies through different regions of the outer ring, whereby the degree of stretch of the fabric resulting from said interfitting step selectively varies in different directions.

11. The method of claim 10 wherein the first ring includes a trim leg extending outwardly from the fabric leg.

12. The method of claim 10 wherein at least one of the first ring and the second ring includes integral locking tabs, said securing step including inserting the outer ring into the inner ring until the locking tabs interlock the first ring and the second ring.

13. The method of claim 12 wherein the fabric is secured to the first ring by the step of molding the first ring in place about a peripheral portion of the fabric, whereby the fabric is encapsulated in the first ring.

* * * * *